Dec. 21, 1937.  C. R. WHITE  2,103,129
CORN PLANTER
Filed May 13, 1936  3 Sheets-Sheet 1
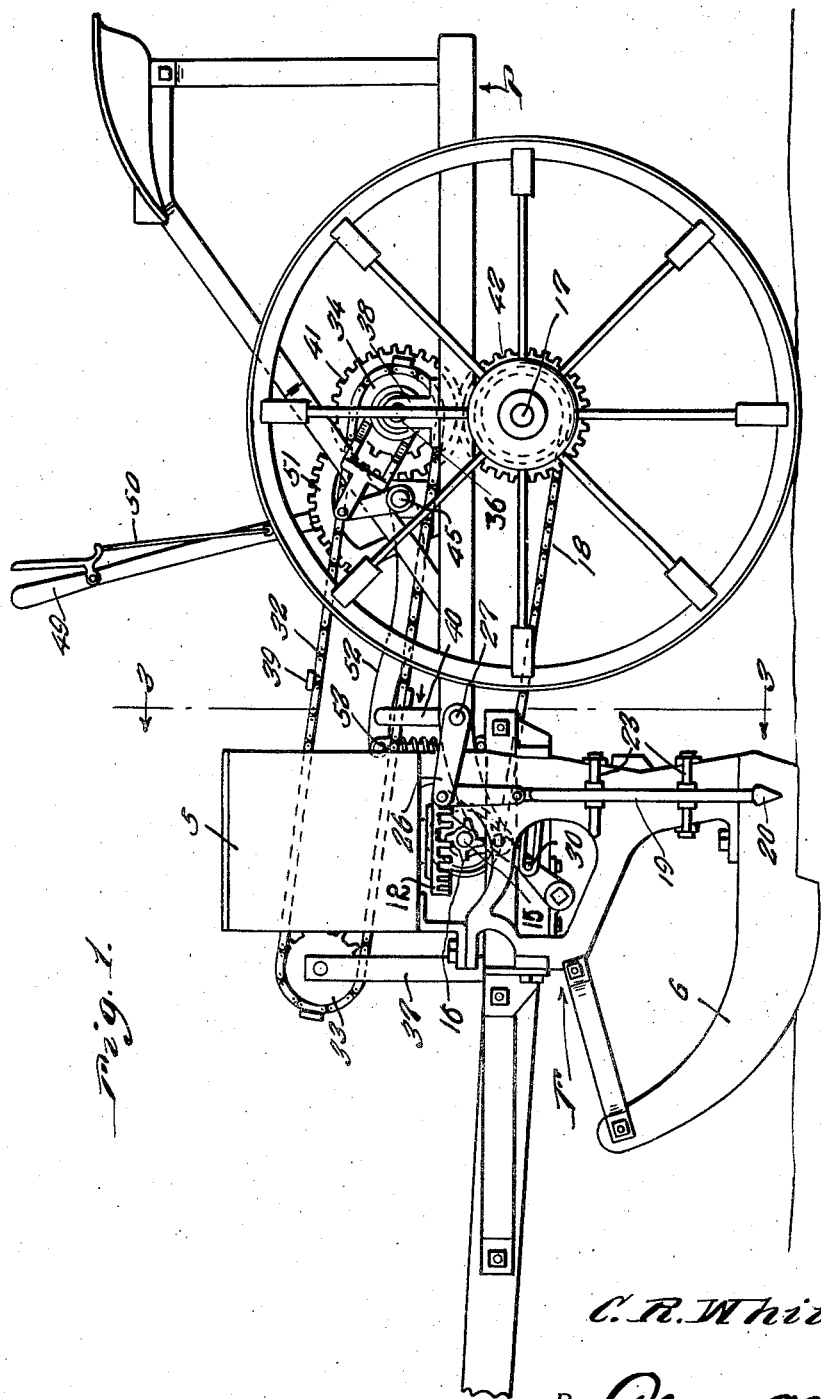
Inventor
C. R. White
By Clarence A. O'Brien and
Hyman Berman
Attorney

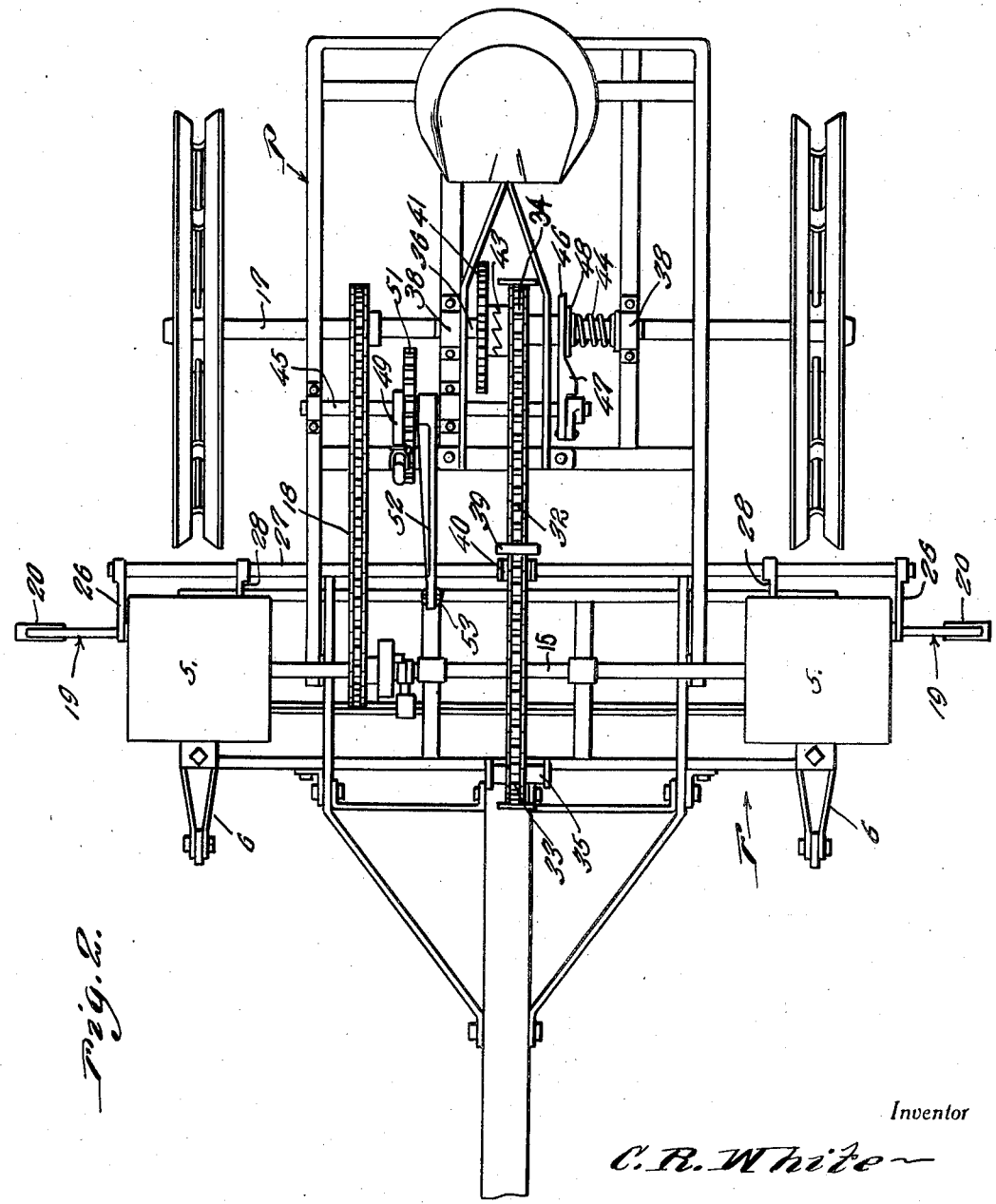

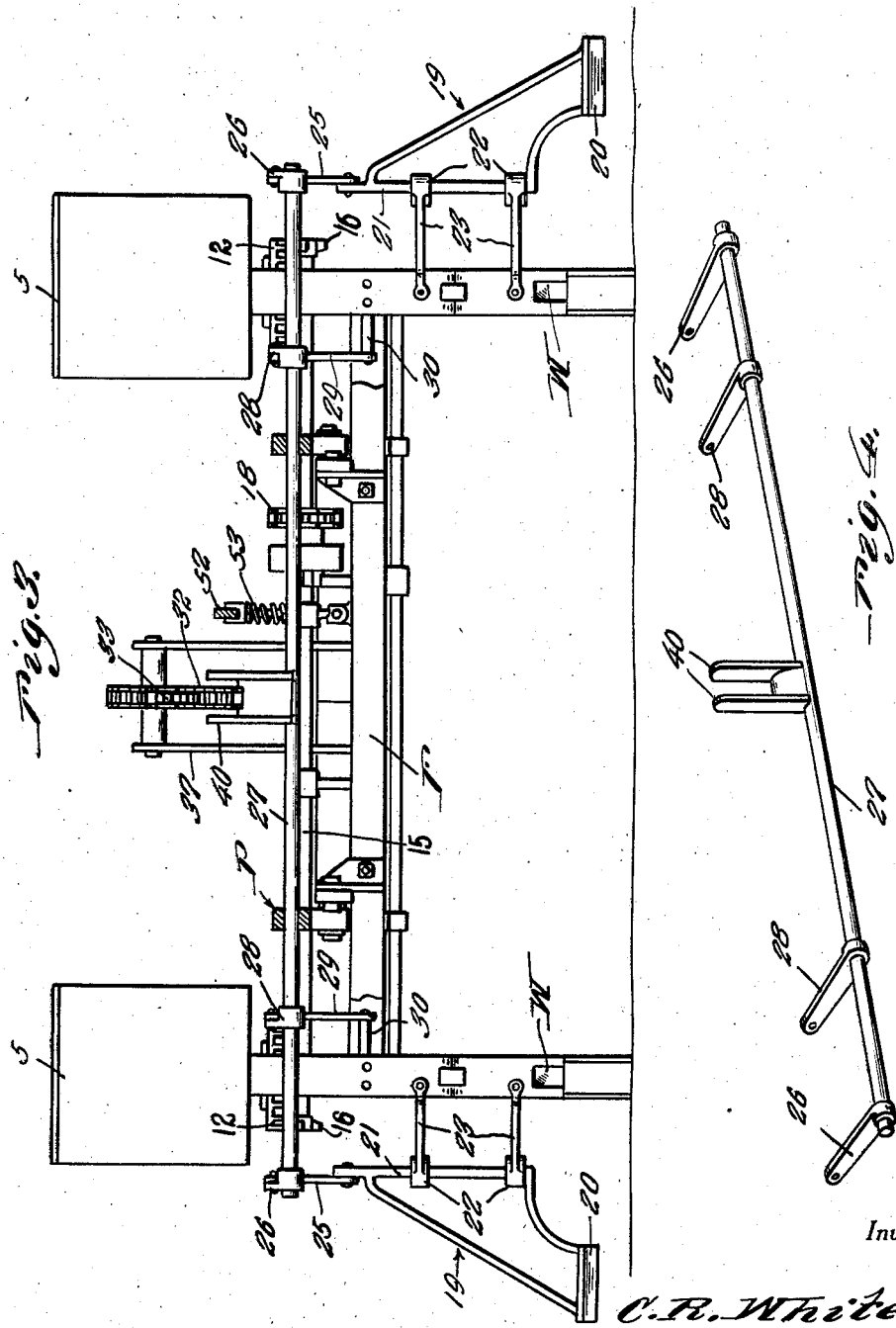

Patented Dec. 21, 1937

2,103,129

UNITED STATES PATENT OFFICE 2,103,129

CORN PLANTER

Chester Raymond White, Mount Carmel, Ill., assignor of one-half to Max Miller, Mount Carmel, Ill.

Application May 13, 1936, Serial No. 79,580

1 Claim. (Cl. 111—30)

This invention relates to corn planters and more particularly to corn planters of the wireless check-row type.

An object of the present invention is to provide a wireless check-row corn planter with improved means for controlling the feeding of the seed from the planter shoes to the ground.

A further object of the invention is to provide the corn planter with improved row marking means.

Further in accordance with the present invention means is provided whereby the driving means from the axle of the planter to the seed controlling means is interrupted incidental to a raising of the frame carrying the seed boxes and planter shoes.

The invention together with its objects and advantages will be best understood from a study of the following description taken in connection with the accompanying drawings wherein:—

Figure 1 is a side elevational view illustrating the application of the invention to a well-known type of wireless check-row corn planter.

Figure 2 is a top plan view further illustrating the application of the invention.

Figure 3 is a transverse sectional view taken substantially on the line 3—3 of Figure 1.

Figure 4 is a perspective view of a shaft forming part of the mechanism for controlling the discharge of the seed from the shoes and the moving of the row markers into and out of marking position.

Referring to the drawings by reference numerals it will be seen that I have illustrated the invention as applied to a more or less conventional corn planter indicated generally as P.

Since the particular type or structure of corn planter is of no material moment and does not form the essence of the invention, the same will not be described in detail, and only such parts thereof will be referred to as will be found necessary for an understanding of the invention.

In connection with the above it will be noted that the planter P includes among other parts a pair of seed boxes 5, each containing seed delivery control mechanism of a type adapted for feeding of the seed from the boxes 5 to the planter shoes 6 and including a toothed driving wheel 12 located beneath the bottom of each box 5.

The planter is also provided, in a more or less conventional manner, with a transversely disposed shaft 15 on which are fixed for rotation therewith toothed wheels 16 meshing with the wheels 12 whereby the latter are rotated to drive the seed delivery mechanisms and effect delivery of the seed at intervals into the boots of the shoes 6.

Also as is somewhat conventional the shaft 15 as shown in Figure 2 is driven from the axle 17 of the planter through the medium of a suitably provided chain and sprocket drive mechanism 18.

A salient feature of the present invention resides in associating with each of the planter shoes 6 a row marker 19 which latter, as shown in Figure 3, is of somewhat triangular frame-like structure having a head 20 that is adapted to be brought into engagement with the ground incidental to a dropping of a seed from the shoe 6 on to the ground so as to make a mark at one side of the hill being planted and thereby aid the operator in forming parallel rows of hills.

As also clearly shown in Figure 3 each of the marking devices 19 has a vertical part 21 which is slidable in vertically spaced bearings 22 provided on the ends of bracket arms 23 suitably mounted on an adjacent shoe 6.

At their upper ends the markers 19 are connected through the medium of links 25 with arms 26 fixed on the respective opposite ends of a shaft 27 suitably journaled transversely of the frame of the planter.

For controlling the dropping of the seed from the shoes 6 onto the ground incidental to a lowering of the markers 19, shaft 27 is also provided with arms 28 which, through the medium of links 29, are connected as indicated generally in Figure 1 with the valve operating mechanisms of the respective shoes 6 for the usual valves, not shown, and with which the shoes 6 are provided.

For rocking the shaft 27 in a counter-clockwise direction (Figure 1) to thereby, and at intervals, and simultaneously, lower the marking elements 19 into ground engaging position and open the valves of the shoes 6 to permit the dropping of the seed onto the ground I provide, as an improvement over the conventional check-row wire, an endless chain 32 trained over sprockets 33 and 34 provided on shafts 35 and 36. Shaft 35 is suitably journaled in a bearing bracket structure 37 disposed forwardly of the seed boxes 5 while shaft 36 is supported transversely of the planter above, and in parallelism with the axle 17 through the medium of suitable bearing brackets 38.

Mounted on the endless chain 32 at intervals are laterally projecting transversely disposed abutment arms 39 which successively move into engagement with abutment arms 40 provided on an intermediate portion of shaft 27 as clearly shown in Figures 2 and 4.

For driving the shaft 36 from the axle 17 there is provided on the shaft 36 to turn therewith a gear 41 that is in constant mesh with a gear 42 provided on the axle 17.

The sprocket 34 is loose on the shaft 36 and is shiftable lengthwise of the shaft. For placing the sprocket 34 in driven engagement with the axle there is provided on one end of the hub of the sprocket 34, and on one end of the hub of the gear 41 complemental clutch elements 43 as shown in Figure 2. The clutch elements 43 are normally interengaged through the medium of a coil spring 44 disposed about one end of shaft 36 and confined between an adjacent bearing 38 and an end of the hub of the sprocket 34.

From the above it will be apparent that when clutch 43 is engaged drive will be transmitted from the axle to the shaft 36 for driving the chain 32. As the chain moves in the path indicated by the arrow in Figure 1 the abutment 39 will successively engage the abutment arms 40 on the shaft 27. Obviously as each abutment 39 engages the abutment arms 40 shaft 27 will be caused to rock in a counter-clockwise direction. Rocking movement of the shaft in this direction will through the medium of the connection between the shaft and the markers 19 cause the markers to move downwardly into marking engagement with the ground, while through the medium of the connection between the shaft 27 and the valve operating mechanisms of the boots 6 the valves of these boots will be caused to open incidental to a downward movement of the marking elements 19 so as to permit the seed to drop from the shoe onto the ground. Thus the dropping of the seed and the marking of the ground are accomplished simultaneously.

It will be also understood, and as shown, that the planter is provided with means for raising and lowering the frame F which is conventional to this type of planter and which supports the seed boxes 5 and the shoes 6, such means in the present instance being illustrated as consisting of a suitably supported rock shaft 45 which is provided with an arm 52 that has a suitable resilient connection 53 with the frame F for raising and lowering the frame and associated parts incidental to a rocking movement of the shaft 45. Also for rocking the shaft 45 there is provided a suitable hand lever 49 provided with a suitable detent 50 cooperable with a suitably mounted rack segment 51 as is also conventional for holding the frame F at either raised or lowered position.

A further feature of the present invention resides in the provision of means for disengaging the clutch 43 incidental to a raising of the frame F. Such means in the present instance consists of an arm to which is pivotally connected a yoke or fork 46 which straddles the shaft 36 and is formed on one side with a cam hump 47 engageable with a flange 48 on the free end of the hub of the sprocket 34 when the shaft 45 is rocked in a clockwise direction to thereby shift the sprocket 34 against the action of spring 44 for disengaging the clutch elements 43.

It will thus be seen that incidental to a raising of the frame F clutch 43 is disengaged so that drive from the axle 17 to the chain 32 is interrupted thereby preventing an operation of the mechanism which controls the feeding of the seed from the boxes 5 to the shoes 6.

Also to enable the operator to ascertain the presence or absence of seed in the shoes each of said shoes 6 is provided at the lower rear portion thereof with a sight window W.

It is thought that the utility and advantages of the invention will be apparent and that from the foregoing description a corn planter equipped in accordance with the present invention will permit of the feeding of the seed at intervals and a marking of the hill simultaneously with the dropping of the seed, all of which may be accomplished in a positive and efficient manner and without requiring any resort to a check-row wire.

Having thus described the invention what is claimed as new is:—

In a check row corn planter, a main frame, traction wheels supporting said frame, an auxiliary frame vertically adjustable on the main frame, seed feeding devices supported by the auxiliary frame and including a seed dropping boot movable toward and from the ground by adjustment of the auxiliary frame in opposite directions, respectively, a row marker mounted alongside said boot for independent vertical operation, means for operating said marker including a rock shaft on the main frame operatively connected to said marker, a sprocket and chain drive operated by one of the traction wheels, coacting tappet devices on said chain and shaft, respectively, means for adjusting the auxiliary frame, and means operative by said adjusting means to render the sprocket and chain drive ineffective as an incident to adjustment of said auxiliary frame to move the boot away from the ground.

CHESTER RAYMOND WHITE.